(12) United States Patent
Hill (10) Patent No.: US 10,466,006 B2
(45) Date of Patent: Nov. 5, 2019

(54) TWO-PIECE BARREL NUT

(71) Applicant: Martin Holdings, LLC, Nevada, MO (US)

(72) Inventor: Martin T. Hill, Nevada, MO (US)

(73) Assignee: Martin Holdings, LLC, Nevada, MO (US)

( * ) Notice: Subject to any disclaimer, the term of this patent is extended or adjusted under 35 U.S.C. 154(b) by 25 days.

(21) Appl. No.: 16/016,904

(22) Filed: Jun. 25, 2018

(65) Prior Publication Data

US 2018/0306547 A1 Oct. 25, 2018

Related U.S. Application Data

(62) Division of application No. 15/061,819, filed on Mar. 4, 2016, now Pat. No. 10,030,930.

(51) Int. Cl.

| F41A 21/48 | (2006.01) |
|---|---|
| F16B 37/00 | (2006.01) |
| F16B 39/06 | (2006.01) |
| F16B 23/00 | (2006.01) |

(52) U.S. Cl.
CPC ........ *F41A 21/482* (2013.01); *F16B 23/0061* (2013.01); *F16B 37/00* (2013.01); *F16B 39/06* (2013.01)

(58) Field of Classification Search
CPC .... F41A 21/482; F16B 23/0061; F16B 37/00; F16B 39/06
See application file for complete search history.

(56) References Cited

U.S. PATENT DOCUMENTS

| 3,877,167 A | 4/1975 | Keppeler |
| 4,765,224 A | 8/1988 | Morris |
| 5,069,587 A | 12/1991 | Levenstein |
| 5,412,895 A | 5/1995 | Krieger |
| 5,472,245 A | 12/1995 | Meske et al. |
| 5,529,450 A | 6/1996 | Mesolella |
| 5,961,266 A | 10/1999 | Tseng |
| 6,959,509 B2 | 11/2005 | Vais |
| 7,216,451 B1 | 5/2007 | Troy |
| 8,726,559 B1 | 5/2014 | Mueller |
| 8,832,921 B2 | 9/2014 | Marks et al. |
| D723,130 S | 2/2015 | Barrett |
| 9,010,009 B2 | 4/2015 | Buxton |
| 9,157,469 B2 | 10/2015 | Marks et al. |
| 2004/0258501 A1 | 12/2004 | Swan |
| 2014/0033590 A1 | 2/2014 | Gomez |

*Primary Examiner* — David P Bryant
*Assistant Examiner* — Nirvana Deonauth
(74) *Attorney, Agent, or Firm* — Martin & Associates, LLC; Derek P. Martin (57) ABSTRACT

A two-piece barrel nut includes an internal nut with an externally threaded portion on one end and a plurality of engageable members on the opposite end, and an external nut with an internally threaded portion on one end that receives the externally threaded portion of the internal nut and one or more receptacles on the other end that each may receive a fastener that engages at least one of the plurality of engageable members on the internal nut to lock the external nut to the internal nut. A method for using the barrel nut to attach a barrel to a firearm is also disclosed.

2 Claims, 6 Drawing Sheets

TWO-PIECE BARREL NUT

BACKGROUND

1. Technical Field

This disclosure generally relates to firearms, and more specifically relates to a barrel nut for a rifle.

2. Background Art

The AR-15 rifle is one of the most popular rifle platforms in the world. An AR-15 rifle typically includes a lower receiver, an upper receiver, and a barrel connected to the upper receiver. A stock and front grip are also typically included. Various other items may be optionally included on an AR-15 rifle, such as front and/or rear sights, a flash suppressor, a bayonet mount, a rail system, various optics including scopes and red-dot sights, tactical lights, sling mounts and slings, etc. Because the design of the lower receiver and upper receiver is uniform between most manufacturers, many different manufacturers make AR-15 lower receivers and upper receivers and parts that are interchangeable. Thus, a person can typically take an AR-15 lower receiver made by a first manufacturer and mate it to an AR-15 upper receiver made by a second manufacturer that is connected to a barrel made by a third manufacturer. This interchangeability of parts, along with the vast number of different accessories that can be added, makes the AR-15 an extremely popular rifle among rifle enthusiasts.

Figure 1:
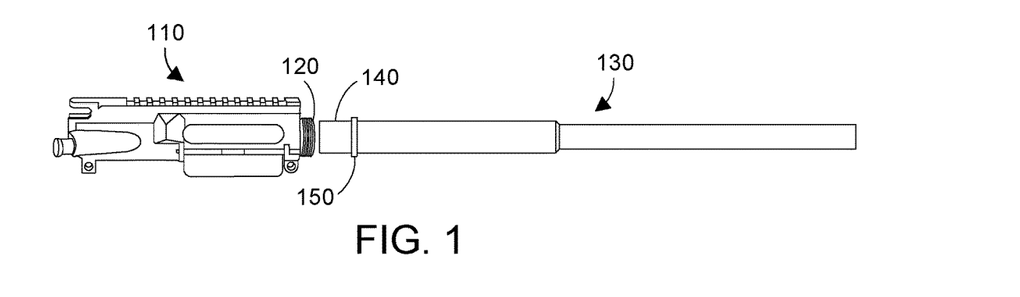
FIG. 1 is shows an upper receiver and a barrel for an AR platform rifle.

The barrel of an AR-15 is connected to the upper receiver using a barrel nut. Referring to FIG. 1, an upper receiver 110 is shown with an externally threaded boss 120. A barrel 130 includes a back portion 140 dimensioned to slide within the interior of the threaded boss 120, with a flange 150 that abuts the face of the threaded boss 120 when the barrel is installed into the upper receiver 110. Once the back portion 140 of barrel 130 is slid into the threaded boss 120 until the flange 150 contacts the front face of the threaded boss 120, a barrel nut is then slid over the free end of the barrel and down the barrel, and is then screwed onto the threads of the threaded boss 120 to secure the barrel 130 to the upper receiver 110.

Various barrel nuts for the AR-15 rifle have been developed over the years. Many of these barrel nuts require separate mounting systems for a front grip, many of which contact the barrel, which reduces accuracy. Some barrel nuts include threaded holes for mounting a front grip, but these also contact the barrel, which reduces accuracy.

BRIEF SUMMARY

A two-piece barrel nut includes an internal nut with an externally threaded portion on one end and a plurality of engageable members on the opposite end, and an external nut with an internally threaded portion on one end that receives the externally threaded portion of the internal nut and one or more receptacles on the other end that each may receive a fastener that engages at least one of the plurality of engageable members on the internal nut to lock the external nut to the internal nut. A method for using the barrel nut to attach a barrel to a firearm is also disclosed.

In one specific configuration, the internal nut includes an externally threaded portion on one end and a scalloped edge on the opposite end that provides a plurality of substantially concave portions as engageable members. The external nut has one or more screw holes on the front face of the external nut. When the internal nut is screwed into the external nut in a proper position, the scalloped edge is in proximity to the screw holes on the front face such that when a retaining screw is installed into the external nut, a head portion of the retaining screw engages one of the substantially concave portions on the scalloped edge of the internal nut, thereby locking the internal nut to the external nut. Aligning a gas tube slot on the external barrel nut to the appropriate gas tube location is easy because the scalloped edge of the internal nut allows small rotational increments in adjusting the position of the internal barrel nut with respect to the external barrel nut.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The AR-15 rifle is typically chambered for the 5.56 mm×45 mm NATO round. A variation of the AR-15 known as the AR-10 uses the same basic design for the 7.62 mm×51 mm round. Many of the parts in an AR-10 are very similar to the corresponding parts in an AR-15, but are sometimes larger and stronger to accommodate the larger, more powerful round. For example, the barrel nut on an AR-10 is typically larger in diameter than the barrel nut on an AR-15 to accommodate the thicker barrel. But besides the diameter, the design is very similar. The AR-10 and AR-15 are referred to herein as the "AR platform" because different sizes of the barrel nut disclosed herein can be used on AR-10 and AR-15 rifles.

Many different barrel nuts have been developed for the AR platform over the years. One prior art barrel nut is shown at 200 in FIG. 2. Barrel nut 200 includes an internally threaded portion 220 designed to screw onto the threads of a threaded boss on an AR platform upper receiver, such as 120 in FIG. 1. Barrel nut 200 further includes a reduced diameter portion 230 that engages the flange 150 shown in FIG. 1 to secure the barrel to the upper receiver. One of the features of the AR platform is a gas tube that runs from the top of the upper receiver along the top of the barrel. To accommodate the gas tube, the barrel nut 200 has a scalloped face with multiple recesses, three of which are identified in FIG. 2 at 210. The barrel nut 200 can be tightened to secure a barrel on a threaded boss of an upper receiver. The barrel nut 200 shown in FIG. 2 includes twenty recesses 210. Thus, once a barrel nut has been tightened to the lower range of specified torque, the barrel nut can typically be tightened a little more, if needed, to align one of the recesses 210 to the gas tube location on the upper receiver. With twenty recesses along the perimeter of the barrel nut, the rotation between recesses is 18°, which means the most the nut must be tightened or loosened to align a recess with the gas tube location on the upper receiver is less than 18°.

Figure 2:
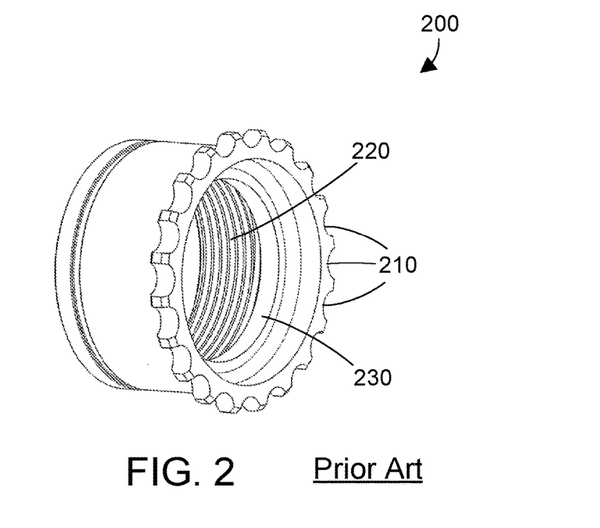
FIG. 2 is a perspective view of a prior art barrel nut.

Some front grips use a clamshell-type configuration to attach a front grip to a prior art barrel nut such as 200 shown in FIG. 2. Many of these clamshell-type configurations attach the forward part of the front grip to the barrel. Newer barrel nuts have been developed that include threaded screw holes for attaching a front grip directly to the barrel nut that allow the front grip to float with respect to the barrel, meaning the front grip is not attached to the barrel. A barrel nut used by Black Rain Ordinance in Neosho, Missouri on their AR platform rifles is a two-piece barrel nut that includes an external nut and an internal nut that screws into the external nut. Threaded holes are provided in the external nut so that once the appropriate position of the internal nut with respect to the external nut is determined, set screws are installed into the external nut and are tightened to lock the external nut to the internal nut. The problem with using set screws is the pressure of the set screw against the internal nut often causes the internal nut to deform and contact the barrel. It has been recognized over the years that having anything touch the barrel of an AR platform rifle anywhere along the barrel's length reduces the accuracy of the rifle. Thus, while the two-piece barrel nut used by Black Rain allows the front grip to float with respect to the barrel by providing threaded holes for mounting the front grip on the barrel nut, the advantage of the floating front grip is somewhat nullified by the internal nut of the two-piece barrel nut contacting the rifle barrel due to the force of the set screws that lock the internal nut to the external nut. This results in decreased accuracy.

Other two-piece barrel nuts have been developed that allow for more easily aligning a gas tube slot on the barrel nut with a gas tube location on the upper receiver. Most of these two-piece barrel nuts do not include threaded holes for attaching a front grip. As a result, an improved barrel nut is needed.

A two-piece barrel nut includes an internal nut with an externally threaded portion on one end and a plurality of engageable members on the opposite end, and an external nut with an internally threaded portion on one end that receives the externally threaded portion of the internal nut and one or more receptacles on the other end that each may receive a fastener that engages at least one of the plurality of engageable members on the internal nut to lock the external nut to the internal nut. A method for using the barrel nut to attach a barrel to a firearm is also disclosed. The barrel nut includes threaded holes for mounting a front grip to the barrel nut. Using the barrel nut disclosed herein results in a barrel that truly floats and is not contacted along its length by either the barrel nut or the front grip.

Figures 3, 4:
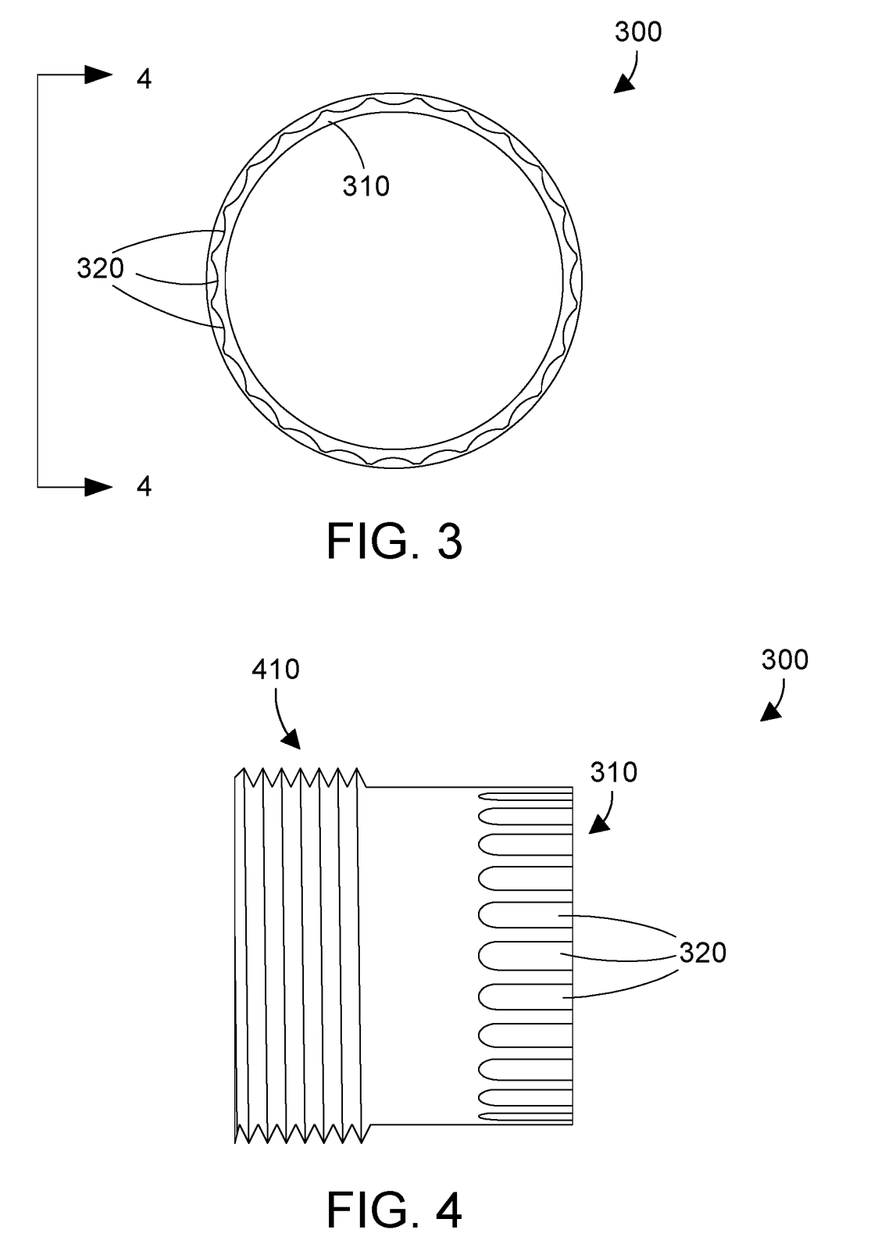
FIG. 3 is a front view of one suitable configuration of an internal barrel nut.
FIG. 4 is a side view of the internal barrel nut in FIG. 3 taken along the line 4-4.

FIG. 3 shows a front view of one specific implementation for the internal nut 300 of the barrel nut disclosed and claimed herein. Note the term "front" as used herein refers to the side that is viewable when looking in the same direction as one looking down the bore of the barrel, while the "back" is the opposite side. FIG. 4 shows a side view of the barrel nut in FIG. 3 taken along the line 4-4. The internal nut 300 preferably has a substantially hollow cylindrical shape. The internal nut 300 includes a scalloped edge 310 on the front end and an externally threaded portion 410 on the back end. The scalloped edge 310 defines multiple substantially concave portions, three of which are shown at 320 in FIGS. 3 and 4. The substantially concave portions 320 are engageable members that can be engaged by one or more fasteners fastened to the external nut to lock the internal nut 300 to the external nut. In the specific configuration shown in the figures, the internal nut 300 includes twenty-four substantially concave portions. The externally threaded portion 410 preferably includes threads of the same size and pitch as the threads on the threaded boss on the upper receiver.

Figure 5:
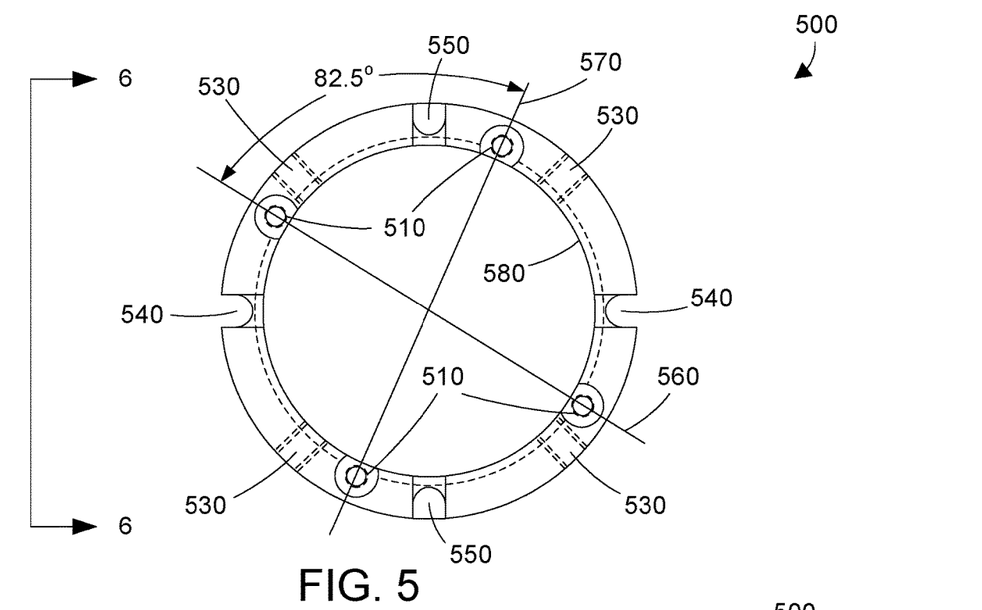
FIG. 5 is a front view of one suitable configuration of an external barrel nut.
Figure 6:
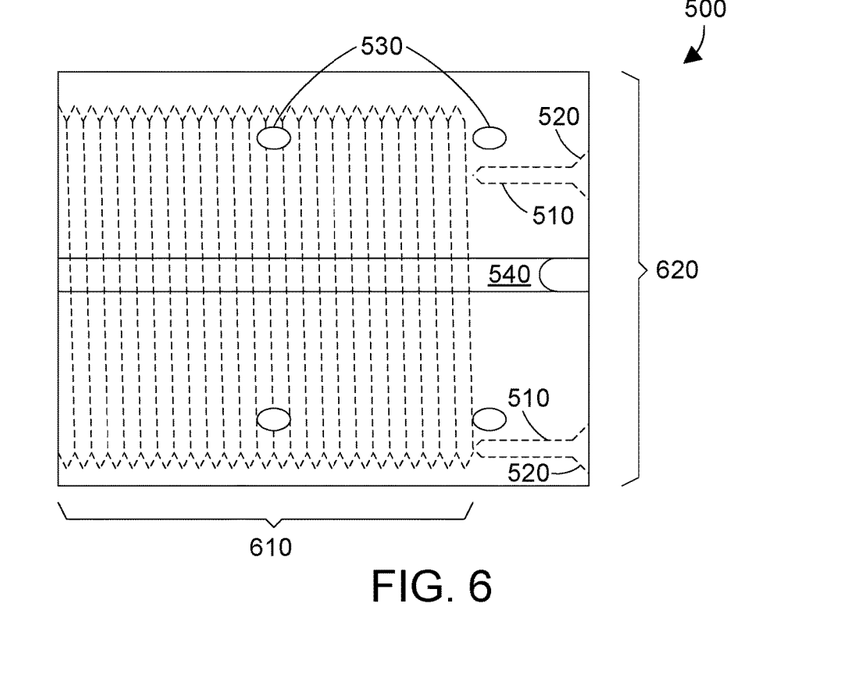
FIG. 6 is a side view of the external barrel nut in FIG. 5 taken along the line 6-6.

One specific implementation of the external nut of the two-piece barrel nut as disclosed and claimed herein is shown at 500 in FIGS. 5 and 6. The external nut 500 preferably has a substantially hollow cylindrical shape. The external nut 500 includes an internally threaded portion 610 at its back and one or more receptacles on the front end for receiving a fastener that engages one or more of the engageable members on the internal nut to lock the external nut to the internal nut. In the specific configuration shown in FIGS. 5 and 6, the receptacles are threaded screw holes 510. As shown more clearly in FIG. 6, each threaded screw hole 510 includes a countersink portion 520 for receiving a flat head of a screw installed in the threaded screw hole 510. Because the screw holes 510 are placed close to the inner wall 580 of the external nut, when a screw is installed into a screw hole 510, part of the head of the screw extends beyond the inner wall 580 of the external nut 500 to engage one of the engageable members on the internal nut, thereby locking the internal nut to the external nut, as shown more clearly in FIGS. 7, 8 and 12.

In the specific configuration for external nut 500 shown in the drawings, four screw holes 510 are provided on the front face of the external nut 500, as shown in FIG. 5. The front face 620 of the external nut 500 is most of what is visible in FIG. 5 and is the right edge shown in FIG. 6. The front face 620 of the external nut 500 preferably lies in a plane that is normal to a longitudinal axis of the external nut 500. The four screw holes 510 are in the form of first and second pairs of opposing threaded holes. Thus, in FIG. 5, a first pair of opposing threaded holes is shown by a line 560 through the corresponding holes 510. A second pair of opposing threaded holes is shown by a line 570 through the corresponding holes 510. Note the lines 560 and 570 are preferably at an angle of 82.5° with respect to each other. Because the scalloped edge 310 of the internal nut 300 preferably has twenty-four substantially concave portions 320, this means there is a rotational angle of 15° between the substantially concave portions 320. By offsetting the first and second pairs of opposing threaded holes by 82.5°, this means the internal nut can be adjusted with respect to the external nut in 7.5° increments.

The external nut 500 includes two gas tube slots 540 along its length. Providing two gas tube slots instead of one provides greater adjustability in using the barrel nut disclosed herein. The external nut 500 also includes opposing recesses 550. The recesses 550 are provided to allow a tool with three or four round posts appropriately spaced to be used to tighten the barrel nut onto an upper receiver by placing two or more of the posts in the gas tube slots 540 and/or the opposing recesses 550. The external nut 500 includes threaded holes 530 for mounting a front grip to the external nut 500 after the barrel nut is properly installed. In the configuration shown in FIGS. 5 and 6, there are eight total holes 530, four on each side of each gas tube slot 540. Thus, regardless of which gas tube slot is selected for alignment with the gas tube location on the upper receiver, four threaded holes 530 are correctly aligned for mounting a front grip.

Figure 7:
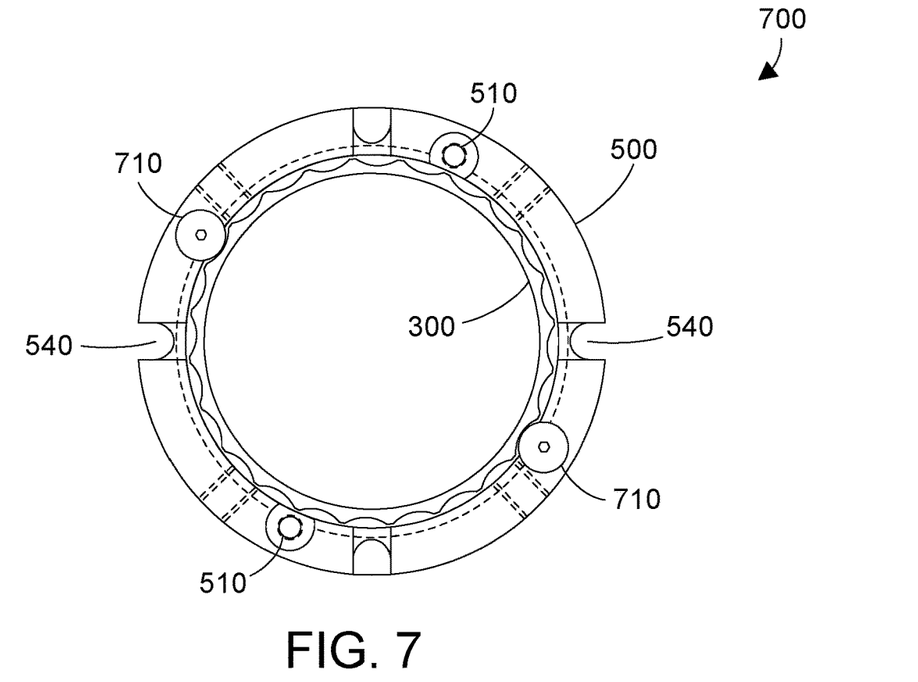
FIG. 7 is a front view showing the two-piece barrel nut with the internal barrel nut installed in the external barrel nut and locked into position with respect to the external barrel nut by installing retaining screws into a first set of opposing holes.
Figure 8:
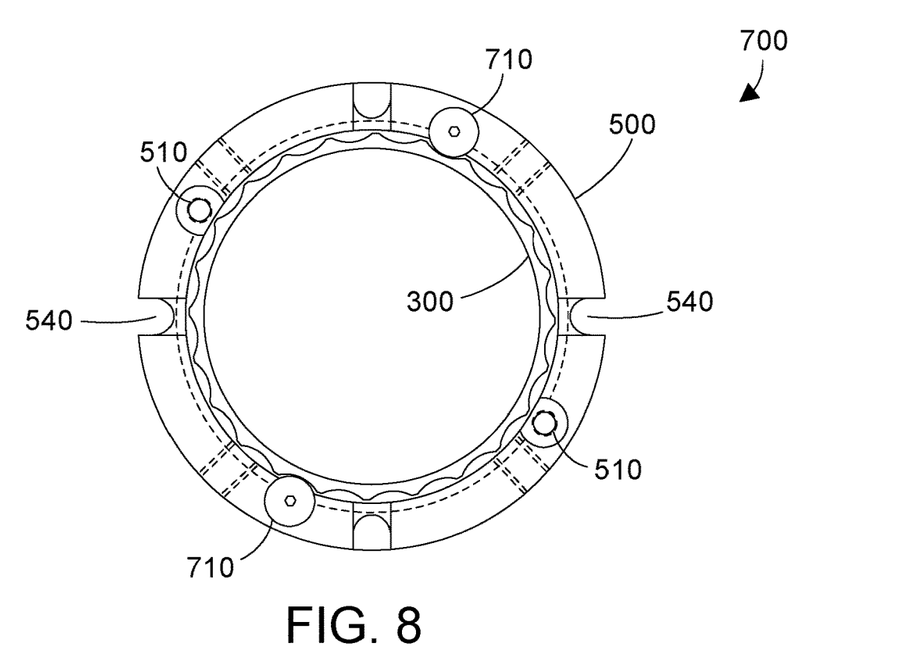
FIG. 8 is a front view showing the two-piece barrel nut with the internal barrel nut installed in the external barrel nut and locked into position with respect to the external barrel nut by installing retaining screws into a second set of opposing holes.

FIG. 7 shows the two-piece barrel nut 700 assembled with the external nut 500 locked to the internal nut 300 by the heads of two screws 710. The heads of the screws 710 extend beyond the inner wall of the external nut 500 and each engages one of the engageable members to lock the external nut 500 to the internal nut 300. Because the two pairs of opposing holes are offset by 82.5°, when one set of holes is aligned with the engageable members, the other set of holes is not aligned with any of the engageable members. Thus, as shown in FIG. 7, when the first set of holes that have screws 710 align with the engageable members as shown, the two empty screw holes 510 are not aligned with any engageable members. In similar fashion, as shown in FIG. 8, when the internal nut is rotated 7.5°, the second pair of opposing holes aligns with the engageable members as shown by the screws 710, while the first pair of opposing holes is not aligned with any of the engageable members. By providing an angular offset between opposing holes, the internal nut has an adjustability with respect to the external nut in 7.5° increments.

Figure 9:
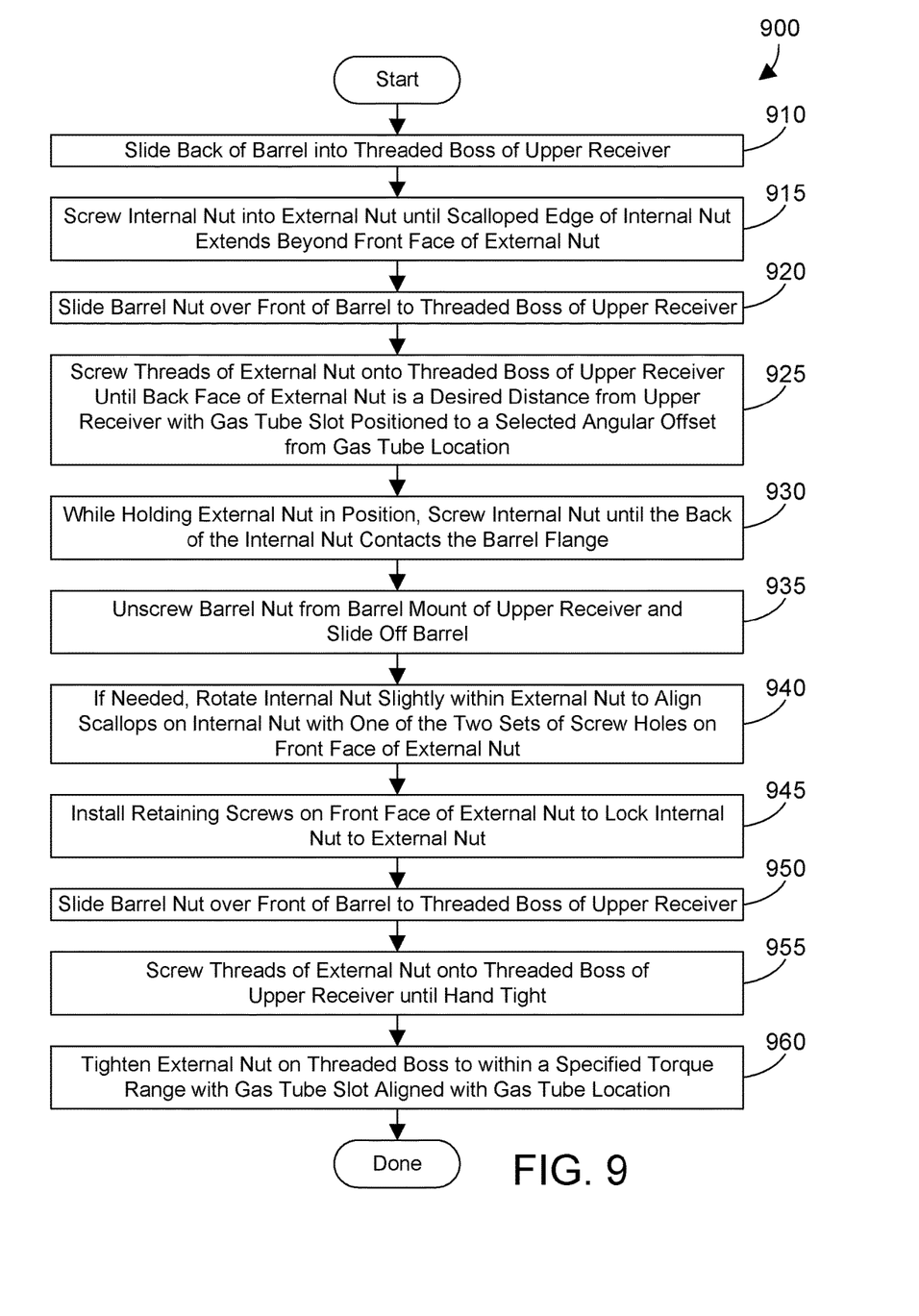
FIG. 9 is flow diagram of a method for installing a barrel into an upper receiver using the two-piece barrel nut disclosed herein.

FIG. 9 shows one suitable method 900 for attaching a barrel to an upper receiver of an AR platform rifle using a two-piece barrel nut as shown in FIGS. 3-6. The back of the barrel is slid into the threaded boss of the upper receiver (step 910). The barrel nut is then assembled by screwing the internal nut into the external nut until the scalloped edge of the internal nut extends beyond the front face of the external nut (step 915). The barrel nut is then slid over the front of the barrel to the threaded boss of the upper receiver (step 920). The threads of the external nut are then screwed onto the threaded boss until the back face of the external nut is a desired distance from the upper receiver, with one of the two gas tube slots positioned at a selected angular offset from gas tube location in the upper receiver (step 925). The desired distance can be any suitable distance, and is preferably 1.5-3.0 mm. One of the gas tube slots is preferably aligned at a selected angular offset with respect to the gas tube location on the upper receiver that is estimated such that when the barrel nut is tightened to an appropriate torque specification, the gas tube slot will align with the gas tube location.

While holding the external nut in the desired position with one hand, the internal nut is screwed into the external nut with the other hand until the back of the internal nut contacts the barrel flange (step 930). This can be done, for example, by using a small hex wrench or screwdriver to push on one of the substantially concave portions of the scalloped edge to rotate the internal nut while holding the external nut in place. The barrel nut is then unscrewed from the threaded boss of the upper receiver and is slid off the barrel (step 935). The relative position of the internal nut to the external nut is then examined visually. If neither of the pairs of opposing holes align with the scallops in the scalloped edge of the internal nut, this means the internal nut needs to be rotated slightly. Thus, if needed, the internal nut is rotated slightly within the external nut to align the scallops on the internal nut with one of the two sets of screw holes in the front face of the external nut (step 940). As discussed above, the offset screw holes provide an adjustment increment of 7.5°, so the amount of adjustment required will be less than 7.5°. Once the internal nut is aligned so its scallops align with the screw holes on the external nut, retaining screws are installed on the front face of the external nut to lock the internal nut to the external nut (step 945), as shown in FIG. 7 or 8. The barrel nut is then slid over the front of the barrel to the threaded boss of the upper receiver (step 950). The threads of the external nut are screwed onto the threaded boss of the upper receiver until hand tight (step 955). A gas tube slot on the barrel nut will then be aligned approximately where it was when the barrel nut was last removed from the barrel. The external nut is then tightened using a suitable wrench designed to engage two or more of the gas tube slots 540 and the opposing recesses 550. The external nut is tightened to be within a specified range of torque until the gas tube slot on the external nut is aligned with the gas tube location (step 960). At this point, a front grip may be attached to the threaded holes 530 on the external nut 500.

Figure 10:
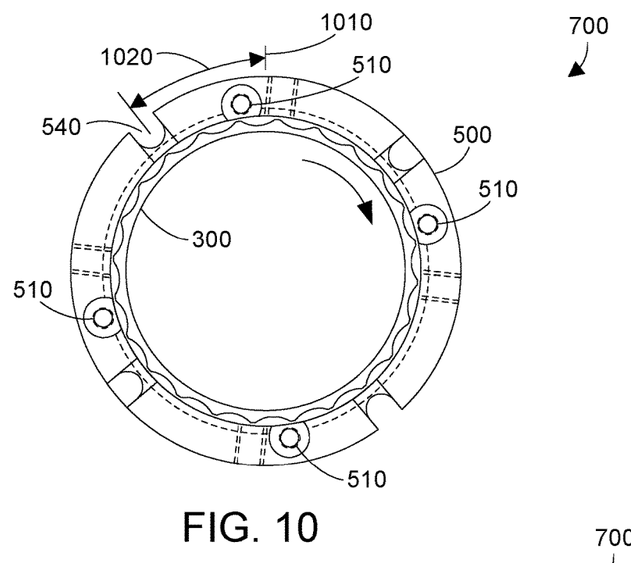
FIG. 10 is a front view of the two-piece barrel nut illustrating the rotation of the internal nut while holding the external nut in a desired position, as described in step 925 of FIG. 9.
Figures 11, 12:
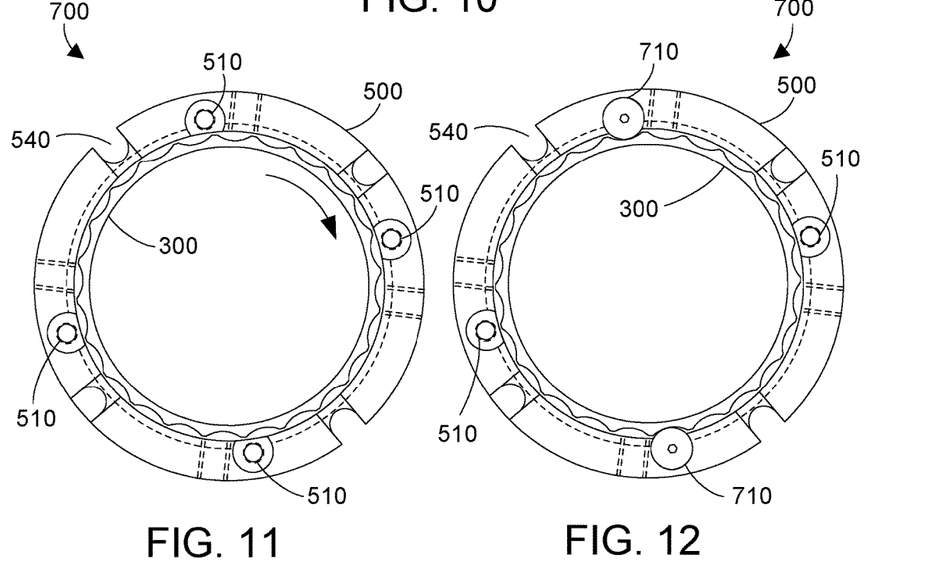
FIG. 11 is a front view of the two-piece barrel nut showing a slight rotation of the internal nut to align the concave portions of the scalloped edge of the internal nut with one of the pairs of opposing holes, as described in step 940 of FIG. 9.
FIG. 12 is a front view of the two-piece barrel nut in FIG. 11 after the internal nut is rotated to align the concave portions of the scalloped edge of the internal nut with one of the pairs of opposing holes and two retaining screws are installed to lock the external nut to the internal nut.

The process of screwing the internal nut into the external nut in step 930 and the locking of the external nut to the internal nut in steps 940 and 945 are shown graphically in FIGS. 10-12. We assume the line 1010 in FIG. 10 represents a desired gas tube location on an upper receiver, which is typically directly on top of the barrel. In step 925 in FIG. 9, once the external nut is threaded onto the threads of the threaded boss on the upper receiver until it is at the desired distance from the upper receiver, the gas tube slots on the external nut are then inspected with respect to a desired gas tube location on the upper receiver. The external barrel nut may then be rotated a small amount until one of the gas tubes is at a desired angle 1020 with respect to the gas tube location 1010, as shown in FIG. 10. This angle 1020 is preferably less than 90 degrees, is more preferably less than 60 degrees, and is most preferably less than 45 degrees. In FIG. 10, the gas tube slot 540 is shown approximately 40 degrees from the gas tube location 1010. The appropriate angle will depend on the thread pitch and torque used to tighten the barrel nut, and an angle of substantially less than 45 degrees may be suitable. A skilled worker will quickly learn the appropriate angle to use to achieve the desired level of torque on the barrel nut when the gas tube slot 540 aligns with the gas tube location 1010.

In step 930 in FIG. 9, a person holds the external nut in the position shown in FIG. 10 with one hand while screwing the internal nut into the external nut until the back face of the internal nut contacts the barrel flange. This rotation of the internal nut is shown by the arrow in FIG. 10, and can take more than a full revolution before the back of the internal barrel nut contacts the barrel flange. The barrel nut is then removed in step 935. We assume after steps 930 and 935 the internal nut and external nut have the rotational relationship shown in FIG. 11. Note the scallops on the internal nut 300 in FIG. 11 are not aligned with any of the holes 510. As a result, the internal nut 300 needs to be rotated slightly until the scallops are aligned with one of the sets of holes. The arrow in FIG. 11 denotes the internal nut is rotated with respect to the external nut a slight amount until the scallops align with one of the sets of screw holes, as shown in FIG. 12. This corresponds to step 940 in FIG. 9. Once aligned, the retaining screws are installed, as shown at 710 in FIG. 12, which corresponds to step 945 in FIG. 9. Note the internal nut could have been rotated in the opposite direction than the direction shown in FIG. 11, which would result in the screws being installed in the other pair of opposing holes. The two sets of opposing holes provide 7.5° increments of adjustability between the internal nut and the external nut.

With the internal nut 300 and external nut 500 locked together using the retaining screws as shown in FIG. 12, the barrel nut is once again placed over the barrel and screwed onto the threaded boss of the upper receiver until hand tight, as shown in step 955 in FIG. 9. At that point the barrel nut will have a rotational orientation similar to that shown in FIG. 10. In step 960, a person uses an appropriate tool to rotate the external nut 500 until the gas tube slot 540 aligns with the gas tube location 1010 in FIG. 10. In other words, for the specific example in FIG. 10, the barrel nut is rotated about 40 degrees for the gas tube slot 540 to align with the gas tube location 1010. The rotation of the barrel nut to the point of the gas tube slot aligning with the gas tube location tightens the barrel nut and preferably achieves the desired level of torque for the barrel nut. Once the barrel nut is installed, a front grip can be attached to the barrel nut, allowing both the barrel nut and front grip to float with respect to the length of the barrel.

While method 900 includes steps that are specific to the design of the internal nut and external nut shown in FIGS. 3-6, one skilled in the art will recognize that similar steps could also be performed for different configurations. For example, different receptacles and fasteners and different engageable portions may require different steps. Method 900 is provided as an example, and should not be construed as limiting.

The desired level of torque can vary according to the materials used in the upper receiver. Most AR platform rifles use 35-70 ft-lbs (47-95 newton meters) of torque on the barrel nut when the upper receiver is forged. However, when the upper receiver is made of a more durable material such as 7075 aluminum, the barrel nut may be tightened to a torque of up to 150 ft-lbs (203 newton meters).

In the version of the two-piece barrel nut for an AR-15 rifle, the upper receiver has threads on the threaded boss of 18 threads per inch (7.09 threads per cm), which means the internally threaded portion 610 of the external nut 500 has a corresponding 18 threads per inch (7.09 threads per cm) and the externally threaded portion 410 of the internal nut 300 also has 18 threads per inch (7.09 threads per cm). This means screwing the barrel nut one full rotation will move the barrel nut linearly 1/18 inch, or 0.05556 inch (1.41 mm). Because the barrel nut disclosed in the figures herein provides 7.5° increments of adjustability between the internal nut and the external nut, this means one increment of adjustment moves the barrel nut 0.005556/48 or 0.00116 inch (0.029 mm). This fine grain adjustability provides a barrel nut that is easy to install.

In the version of the barrel nut for an AR-10 rifle, the upper receiver has threads on the threaded boss of 16 threads per inch (6.3 threads per cm), which means the internally threaded portion 610 of the external nut 500 has a corresponding 16 threads per inch (6.3 threads per cm) and the externally threaded portion 410 of the internal nut 300 also has 16 threads per inch (6.3 threads per cm). This means screwing the barrel nut one full rotation will move the barrel nut 1/16 inch, or 0.0625 inch (1.59 mm). Because the barrel nut disclosed in the figures herein provides 7.5° increments of adjustability between the internal nut and the external nut, this means one increment of adjustment moves the barrel nut 0.00625/48 or 0.0013 inch (0.033 mm). Once again, this fine grain adjustability provides a barrel nut that is easy to install.

The two-piece barrel nut disclosed herein is a significant improvement to the two-piece barrel nut used by Black Rain Ordinance discussed above. Because the screws that lock the internal nut to the external nut are on the front face of the barrel nut, there is no pressure from set screws that causes the internal barrel nut to deform and contact the barrel. As a result, the barrel nut disclosed and claimed herein does not contact the barrel at any location except the barrel flange, and provides mounting holes for a front grip. With an AR platform rifle with a machined upper receive made of 7075 aluminum, the combination of increased torque on the barrel nut and the fact that neither the barrel nut nor the front grip contact the barrel anywhere except the barrel flange results in an AR platform rifle with increased accuracy.

A two-piece barrel nut includes an internal nut with an externally threaded portion on one end and a plurality of engageable members on the opposite end, and an external nut with an internally threaded portion on one end that receives the externally threaded portion of the internal nut and one or more receptacles on the other end that each may receive a fastener that engages at least one of the plurality of engageable members on the internal nut to lock the external nut to the internal nut. A method for using the barrel nut to attach a barrel to a firearm is also disclosed.

The disclosure and claims herein disclose a barrel nut comprising an internal nut in a substantially hollow cylindrical shape comprising: an externally threaded portion on a first end; and a plurality of engageable members on a second end opposite the first end; an external nut in a substantially hollow cylindrical shape comprising: an internally threaded portion on a first end that receives the externally threaded portion of the internal nut; and at least one receptacle on a second end opposite the first end for receiving a fastener that engages at least one of the plurality of engageable members on the internal nut to lock the external nut to the internal nut.

The disclosure and claims herein disclose a barrel nut comprising: an internal nut in a substantially hollow cylindrical shape comprising: an externally threaded portion on a first end; and a scalloped edge on a second end opposite the first end that provides a plurality of substantially concave members around the perimeter of the second end; an external nut in a substantially hollow cylindrical shape comprising: an internally threaded portion on a first end that receives the externally threaded portion of the internal nut; and a plurality of threaded holes on a second end opposite the first end for receiving a screw having a head portion that engages at least one of the plurality of substantially concave members on the internal nut to lock the external nut to the internal nut.

The disclosure and claims herein disclose a method for attaching a barrel to a firearm, wherein the barrel includes a back portion and a flange, the method comprising: sliding the back portion of the barrel into a threaded boss on the firearm; screwing an internal nut of a barrel nut into an external nut of the barrel nut, wherein the internal nut is in a substantially hollow cylindrical shape comprising: an externally threaded portion on a first end; and a plurality of engageable members on a second end opposite the first end; wherein the external nut is in a substantially hollow cylindrical shape comprising: an internally threaded portion on a first end that receives the externally threaded portion of the internal nut; and at least one receptacle on a front face of a second end opposite the first end for receiving a fastener that engages at least one of the plurality of engageable members on the internal nut to lock the external nut to the internal nut; wherein the internal nut is screwed into the external nut until the second end of the internal nut extends beyond the front face of the external barrel nut; sliding the barrel nut over a front of the barrel to the threaded boss; screwing the internally threaded portion of the external nut onto the threaded boss until a back face of the external nut is a desired distance from a portion of the firearm and a gas tube slot on the external nut is positioned to a selected angular offset from a gas tube location on the firearm; while holding the external nut in position, screwing the internal nut into the external nut until the back of the internal nut contacts the flange of the barrel; unscrewing the barrel nut from the threaded boss of the upper receiver; sliding the barrel nut off the barrel; if needed, rotating the internal nut slightly within the external nut to align the at least one receptacle on the external nut with at least one of the plurality of engageable members on the internal nut; installing at least one fastener into the at least one receptacle to lock the internal nut to the external nut; sliding the barrel nut over the front of the barrel to the threaded boss on the firearm; screwing the internally threaded portion of the external nut onto the threaded boss until hand tight; and tightening the external nut on the threaded boss to within a specified torque range with the gas tube slot aligned with the gas tube location.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while screw holes are disclosed as one suitable implementation for a receptacle and screws are disclosed as one suitable fastener that can be used to lock the internal nut to the external nut, the disclosure and claims herein extend to any suitable receptacle(s) and fastener(s) that could be used to lock the internal nut to the external nut. Furthermore, while a scalloped edge that provides a plurality of substantially concave members around the perimeter of the internal nut is shown in the figures as one example of a plurality of engageable members on the internal nut, the disclosure and claims herein expressly extend to any suitable configuration that provides a plurality of engageable members on the internal nut, whether currently known or developed in the future. For example, instead of a scalloped edge that provides a plurality of substantially concave engageable portions, the internal nut could provide an edge with notches similar to the top of a castle nut, where a screw head fastener could engage one of the notches to lock the internal nut to the external nut. In addition, while two screws in opposing holes are shown as fasteners to lock the internal nut to the external nut, only one screw could be used, or more than two screws could be used. Furthermore, while the configuration disclosed here shows a fastener engaging a single engageable member, other configurations within the scope of the disclosure and claims herein can have one or more fasteners that each engages two or more engageable members. In addition, while twenty four engageable members are shown in the figures, other numbers and type of engageable members could be used. These and other variations are within the scope of the disclosure and claims herein.

The invention claimed is:

1. A method for attaching a barrel to a firearm, wherein the barrel includes a back portion and a flange, the method comprising:
    sliding the back portion of the barrel into a threaded boss on the firearm;
    screwing an internal nut of a barrel nut into an external nut of the barrel nut, wherein the internal nut is in a substantially hollow cylindrical shape comprising:
        an externally threaded portion on a first end; and
        a plurality of engageable members on a second end opposite the first end;
    wherein the external nut is in a substantially hollow cylindrical shape comprising:
        an internally threaded portion on a first end that receives the externally threaded portion of the internal nut; and
        at least one receptacle on a front face of a second end opposite the first end for receiving a fastener that engages at least one of the plurality of engageable members on the internal nut to lock the external nut to the internal nut;
    wherein the internal nut is screwed into the external nut until the second end of the internal nut extends beyond the front face of the external barrel nut;
    sliding the barrel nut over a front of the barrel to the threaded boss;
    screwing the internally threaded portion of the external nut onto the threaded boss until a back face of the external nut is a desired distance from a portion of the firearm and a gas tube slot on the external nut is positioned to a selected angular offset from a gas tube location on the firearm;
    while holding the external nut in position, screwing the internal nut into the external nut until the back of the internal nut contacts the flange of the barrel;
    unscrewing the barrel nut from the threaded boss of the upper receiver;
    sliding the barrel nut off the barrel;
    if needed, rotating the internal nut slightly within the external nut to align the at least one receptacle on the external nut with at least one of the plurality of engageable members on the internal nut;
    installing at least one fastener into the at least one receptacle to lock the internal nut to the external nut;
    sliding the barrel nut over the front of the barrel to the threaded boss on the firearm;
    screwing the internally threaded portion of the external nut onto the threaded boss until hand tight; and
    tightening the external nut on the threaded boss to within a specified torque range with the gas tube slot aligned with the gas tube location.

2. The method of claim 1 further comprising attaching a grip to a plurality of threaded holes on the external nut.

* * * * *